March 22, 1949. C. E. SHAFFER 2,465,177
FLANGE-UNION SPREADER
Filed Jan. 6, 1947

CLARENCE E. SHAFFER
INVENTOR.

BY

AGENT

Patented Mar. 22, 1949

2,465,177

UNITED STATES PATENT OFFICE 2,465,177

FLANGE-UNION SPREADER

Clarence E. Shaffer, Los Angeles, Calif., assignor to Socony-Vacuum Oil Company, Incorporated, New York, N. Y., a corporation of New York Application January 6, 1947, Serial No. 720,369

1 Claim. (Cl. 254—100)

My invention relates to apparatus for separating flanged pipe unions.

It is often desirable to disconnect pipe unions and to spread the flanges a short distance apart. The operation is performed for various purposes, such as for changing gaskets or, more frequently, for inserting or removing blind spacers. The latter are solid disks inserted in pipe unions for blocking the pipe when there is no valve at the proper point or when it is preferred not to rely on a valve because of the possibility of leakage or inadvertent opening.

The usual method of spreading a flange union has been to drive a wedge into the union by blows of a hammer. This method has a number of faults. Inflammable gas from a partially opened pipe may be ignited by sparks from the hammer, the wedge is often dislodged by an incorrect hammer blow, and in some cases the elasticity of the pipe ejects the wedge after each blow, making it extremely difficult to open the union. Workmen are tempted to rely on the wedge to hold the flanges apart after a union is opened, which is hazardous because in some cases dislodgment of a wedge may permit a union to close on a workman's fingers and because the ejected wedge itself may inflict serious injury.

An object of my invention is to provide a simple and effective device for spreading flange unions.

Another object of my invention is to provide a flange-union spreader which serves to hold a separated union securely open.

Other objects and advantages of my invention will be apparent from the following description and from the drawing, in which.

Figure 1:
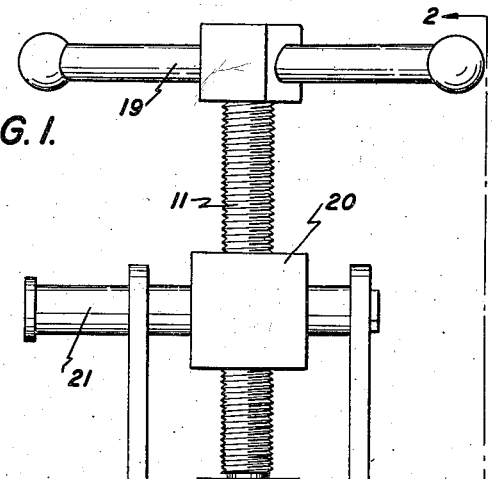
Fig. 1 is a view of the device in place on a flanged pipe union, taken on the line 1—1 of Fig. 2.
Figure 3:
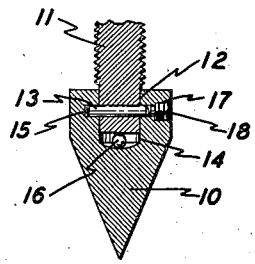
Fig. 3 is a fragmentary sectional view showing the connection between the wedge and the screw.
Figure 2:
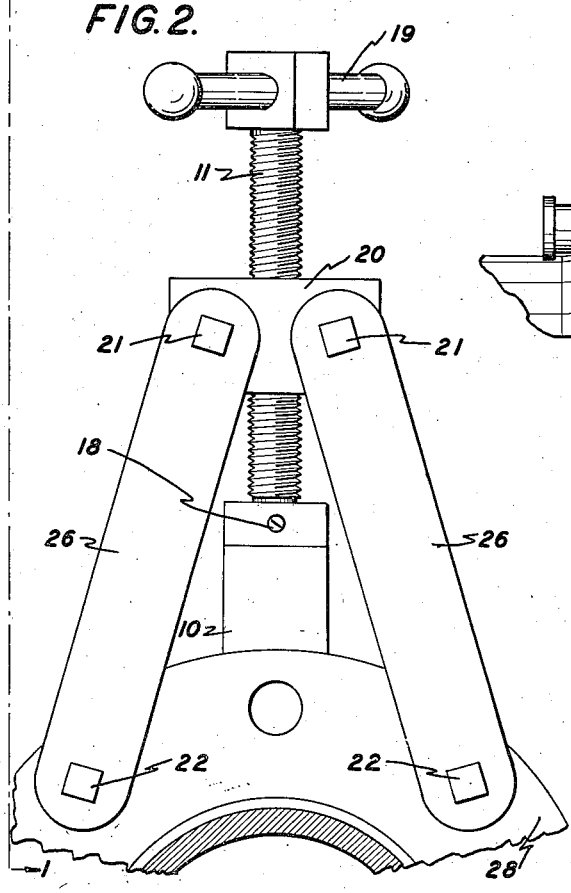
Fig. 2 is another view of the device, taken on the line 2—2 of Fig. 1.

Referring to the drawing, wedge 10 is rotatably mounted at the end of screw 11 in the manner shown in Fig. 3. The screw is provided with a smoothed end 12 which is transversely drilled to receive pin 13. The wedge is provided with a cavity 14 fitting the smoothed end of the screw and with an internal annular groove 15 to receive the ends of pin 13. Ball bearing 16 is placed between the end of screw 11 and the concave bottom of cavity 14. Assembly is accomplished by inserting pin 13 through threaded hole 17 which is subsequently closed by screw 18.

The end of screw 11 opposite wedge 10 is equipped with handle 19.

Rectangular block 20 has a central threaded opening to fit screw 11 and two holes near the ends, transverse to the threaded opening, to receive pins 21—21.

Figure 4:
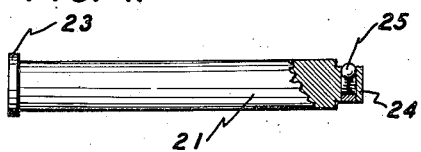
Fig. 4 is a view, partially in section, of one of the pins.

Pins 21—21 and the similar pins 22—22 are constructed as shown in Fig. 4. Each pin is cylindrical in its major portion, provided with a head 23 at one end, and provided with a squared portion 24 at the other end. The squared portion is equipped with a spring-urged ball detent 25.

Pins 21—21 are connected with pins 22—22 by four links. Two of the links 26—26, are provided near the ends with square holes to fit squared portions 24 of the pins. The remaining two links, one of which is shown at 27, are provided with similarly situated round holes to fit the cylindrical portions of the pins.

To use the device, the bolts are first removed from a pair of pipe flanges such as illustrated at 28—28. Then the flange-union spreader, fully assembled except for links 26—26, is placed in position by inserting pins 22—22 through bolt holes of the flanges, and next links 26—26 are put in place to complete the connection between pins 21—21 and pins 22—22. Wedge 10 is then moved to a position directly over the union and screwed down, forcing flanges 28—28 apart until the opening is as wide as desired.

In the case of very large flanges or in the case of unions which require an unusual degree of force to separate, it is preferable that two spreaders be used simultaneously, on opposite sides of the pipe.

I claim:

A device for spreading flange unions, comprising: a screw; a wedge rotatably mounted on an end of said screw; a block provided with a threaded central opening engaging said screw and provided with two smooth holes on opposite sides of said threaded opening and transverse thereto; a first pair of pins, slidably fitting within said smooth holes and each having terminal portions protruding on opposite sides of said block; a second pair of pins, each being adapted to pass through matching bolt holes of a flange union with terminal portions extending on both sides of said flange union; a set of links arranged to connect the terminal portions of one of said second pair of pins with the terminal portions of one of said first pair of pins and to connect the terminal portions of the other of said second pair of pins with the other of said first pair of pins while said four pins are disposed in substantially parallel relation with one another; and means for rotating said screw, whereby said wedge is forced between the flanges of said union.

CLARENCE E. SHAFFER.

REFERENCES CITED

The following references are of record in the file of this patent:

UNITED STATES PATENTS

| Number | Name | Date |
| --- | --- | --- |
| 2,213,227 | Persson | Sept. 3, 1940 |
| 2,352,290 | Saul et al. | June 27, 1944 |
| 2,353,623 | Saul | July 11, 1944 |
| 2,420,438 | Morgan | May 13, 1947 |
| 2,444,097 | Grant | June 29, 1948 |